United States Patent
Chen et al.

(10) Patent No.: US 9,912,439 B2
(45) Date of Patent: Mar. 6, 2018

(54) METHOD AND APPARATUS FOR SENDING CHANNEL STATE INFORMATION USING SUBFRAME-DEPENDENT CONTROL CHANNEL FORMATS

(71) Applicant: QUALCOMM INCORPORATED, San Diego, CA (US)

(72) Inventors: Wanshi Chen, San Diego, CA (US); Juan Montojo, Nuremberg (DE); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 13/672,148

(22) Filed: Nov. 8, 2012

(65) Prior Publication Data
US 2013/0121270 A1    May 16, 2013

Related U.S. Application Data

(60) Provisional application No. 61/558,318, filed on Nov. 10, 2011.

(51) Int. Cl.
*H04L 1/00* (2006.01)
*H04L 5/00* (2006.01)
*H04W 72/00* (2009.01)

(52) U.S. Cl.
CPC .......... *H04L 1/0027* (2013.01); *H04L 1/0028* (2013.01); *H04L 5/001* (2013.01);
(Continued)

(58) Field of Classification Search
None
See application file for complete search history.

(56) References Cited

U.S. PATENT DOCUMENTS

| 2009/0196247 A1 | 8/2009 | Fan et al. |
| 2009/0225738 A1* | 9/2009 | Xu et al. ............... 370/343 |

(Continued)

FOREIGN PATENT DOCUMENTS

| EP | 2230786 A1 | 9/2010 |
| WO | WO-2011040751 A2 | 4/2011 |
| WO | WO-2011085230 | 7/2011 |

OTHER PUBLICATIONS

Huawei et al., "Periodic CQI/PMI/RI reporting for CA", 3GPP Draft; R1-105833, 3rd Generation Partnership Project (3GPP), Mobile Competence Centre; 650, Route Des Lucioles; F-06921 Sophia-Antipolis Cedex; France, val. RAN WG1, No. Jacksonville, USA; Nov. 15, 2010, Nov. 9, 2010, [retrieved on Nov. 9, 2010].

(Continued)

*Primary Examiner* — Peter Chau
(74) *Attorney, Agent, or Firm* — Patterson & Sheridan, L.L.P.

(57) ABSTRACT

Techniques for reporting channel state information (CSI) for multiple cells (e.g., carriers) using multiple control channel formats are disclosed. A user equipment (UE) may be configured for operation on a plurality of cells. The UE may be configured to periodically report CSI for the plurality of cells and may also report CSI whenever requested. The UE may be configured with a plurality of control channel formats for sending CSI and possibly other control information in different subframes. The plurality of control channel formats may be associated with at least two different capacities. The UE may report CSI for the plurality of cells in the plurality of subframes based on the plurality of control channel formats.

29 Claims, 9 Drawing Sheets

(52) U.S. Cl.
CPC .......... *H04L 5/0035* (2013.01); *H04L 5/0057* (2013.01); *H04L 1/0026* (2013.01); *H04L 5/0055* (2013.01); *H04L 5/0083* (2013.01); *H04W 72/00* (2013.01)

(56) References Cited

U.S. PATENT DOCUMENTS

| | | | |
|---|---|---|---|
| 2010/0034092 A1 | 2/2010 | Krishnamurthy et al. | |
| 2010/0098012 A1 | 4/2010 | Bala et al. | |
| 2010/0272019 A1* | 10/2010 | Papasakellariou | H04B 7/0417 370/328 |
| 2010/0303013 A1* | 12/2010 | Khandekar et al. | 370/328 |
| 2011/0141928 A1* | 6/2011 | Shin | H04L 1/0028 370/252 |
| 2011/0188393 A1 | 8/2011 | Mallik et al. | |
| 2011/0249578 A1 | 10/2011 | Nayeb Nazar et al. | |
| 2011/0250918 A1* | 10/2011 | Jen | 455/509 |
| 2011/0319068 A1 | 12/2011 | Kim et al. | |
| 2012/0076028 A1 | 3/2012 | Ko et al. | |
| 2012/0113831 A1* | 5/2012 | Pelletier | H04L 5/0053 370/252 |
| 2012/0220286 A1 | 8/2012 | Chen et al. | |
| 2013/0077514 A1* | 3/2013 | Dinan | 370/252 |
| 2014/0286276 A1* | 9/2014 | Lunttila et al. | 370/329 |
| 2017/0111899 A1* | 4/2017 | Pan | H04W 72/0413 |

OTHER PUBLICATIONS

International Search Report and Written Opinion—PCT/US2012/064333—ISA/EPO—dated Oct. 11, 2013.
Nokia Siemens Networks et al: "Views on PUCCH enhancements for Carrier Aggregation", 3GPP Draft; R1-114306, 3rd Generation Partnership Project (3GPP), Mobile Competence Centre; 650, Route Des Lucioles; F-06921 Sophia-Antipolis Cedex; France, val. RAN WG1, No. San Francisco, USA; Nov. 14, 2011-Nov. 18, 2011, Nov. 8, 2011, [retrieved on Nov. 8, 2011].
Partial International Search Report—PCT/US2012/064333—ISA/EPO—dated Aug. 12, 2013.
Samsung: "Details of CQI definition for LTE-A", 3GPP Draft; R1-106034, 3rd Generation Partnership Project (3GPP), Mobile Competence Centre ; 650, Route Des Lucioles ; F-06921 Sophia-Antipolis Cedex ; France, vol. RAN WG1, No. Jacksonville, USA; Nov. 15, 2010, Nov. 9, 2010 (Nov. 9, 2010), XP050466815, [retrieved on Nov. 9, 2010] section 1 Introduction section 3 CQI definition for Rel-10 section 7.2.3 Channel quality indicator (CQI) definition.

\* cited by examiner

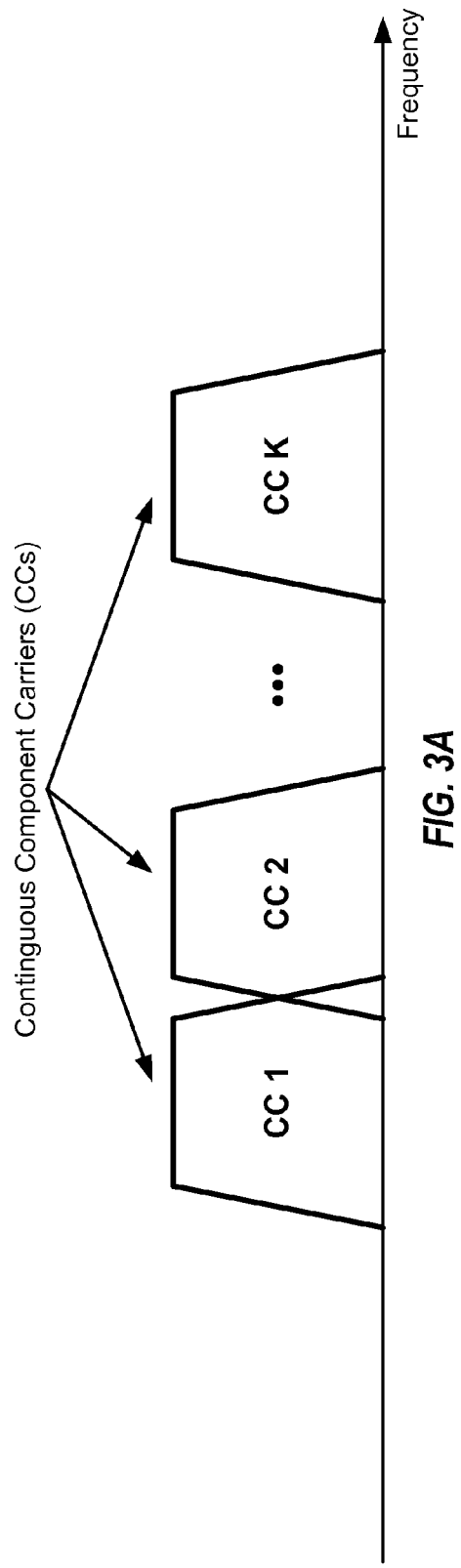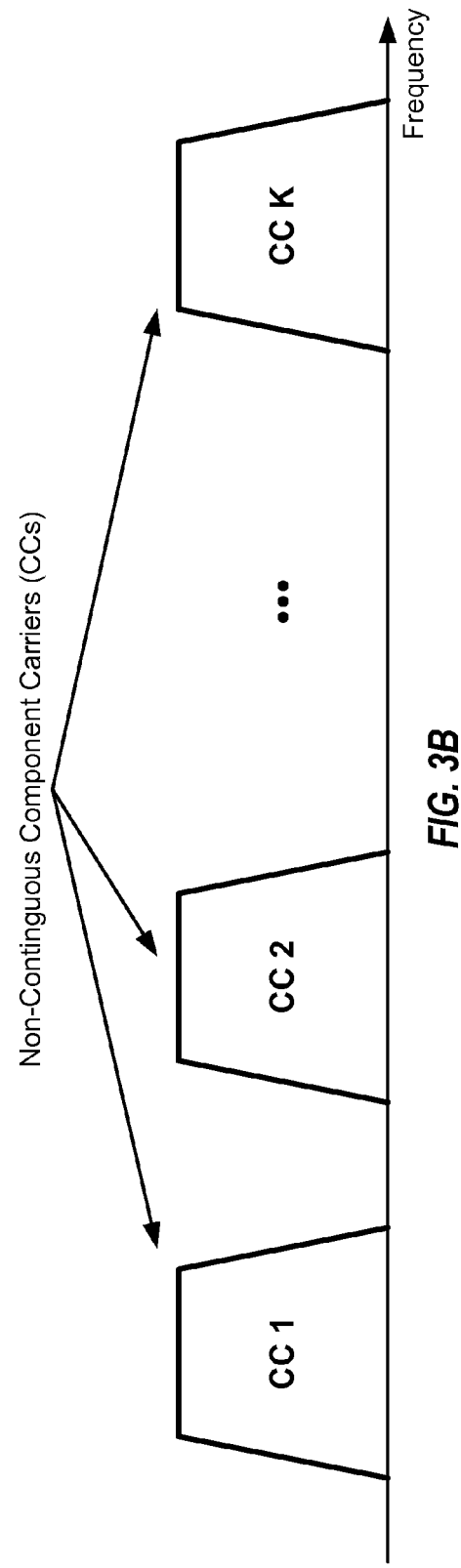

METHOD AND APPARATUS FOR SENDING CHANNEL STATE INFORMATION USING SUBFRAME-DEPENDENT CONTROL CHANNEL FORMATS

CLAIM OF PRIORITY UNDER 35 U.S.C. § 119

The present Application for Patent claims priority to Provisional U.S. Application Serial No. 61/558,318, entitled "METHOD AND APPARATUS FOR SENDING CHANNEL STATE INFORMATION USING SUBFRAME-DEPENDENT CONTROL CHANNEL FORMATS," filed Nov. 10, 2011, assigned to the assignee hereof, and expressly incorporated herein by reference.

BACKGROUND

I. Field

The present disclosure relates generally to communication, and more specifically to techniques for sending control information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics, which may be conveyed in signaling information that describes operation on the carrier. A carrier may also be referred to as a component carrier (CC), a frequency channel, a cell, etc. A base station may send data transmission on multiple carriers for the downlink (or downlink carriers) to a UE. The UE may send control information on a carrier for the uplink (or any uplink carrier) to support data transmission on the multiple downlink carriers.

SUMMARY

Techniques for reporting channel state information (CSI) for multiple cells with multiple control channel formats are disclosed herein. A UE may be configured for operation on multiple cells (e.g., multiple carriers for carrier aggregation). The UE may also be configured to periodically report CSI for the multiple cells. The CSI reporting configuration for each cell may specify which types of CSI to report for the cell and when to report each type of CSI. The UE may also report CSI whenever requested. The UE may report CSI for one or more cells in a given subframe and may have one or more types of CSI to report for each cell.

In an aspect of the present disclosure, the UE may be configured with a plurality of control channel formats for sending control information in different subframes in order to avoid or mitigate dropping CSI due to CSI being reported for multiple cells in a subframe. Different control channel formats may be associated with different capacities. This would enable the UE to send CSI for multiple CCs and/or to send CSI with other control information.

In one design, the UE may identify a plurality of cells for which to report CSI. The UE may determine a plurality of control channel formats to use to report the CSI for the plurality of cells in a plurality of subframes. The UE may report the CSI for the plurality of cells in the plurality of subframes based on the plurality of control channel formats. In one design, the UE may determine CSI to report for the plurality of cells in a subframe, determine a control channel format to use in the subframe, and send the CSI in the subframe based on the control channel format.

Various aspects and features of the disclosure are described in further detail below.

BRIEF DESCRIPTION OF THE DRAWINGS

FIG. 3A shows an example of continuous carrier aggregation.
FIG. 3B shows an example of non-continuous carrier aggregation.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
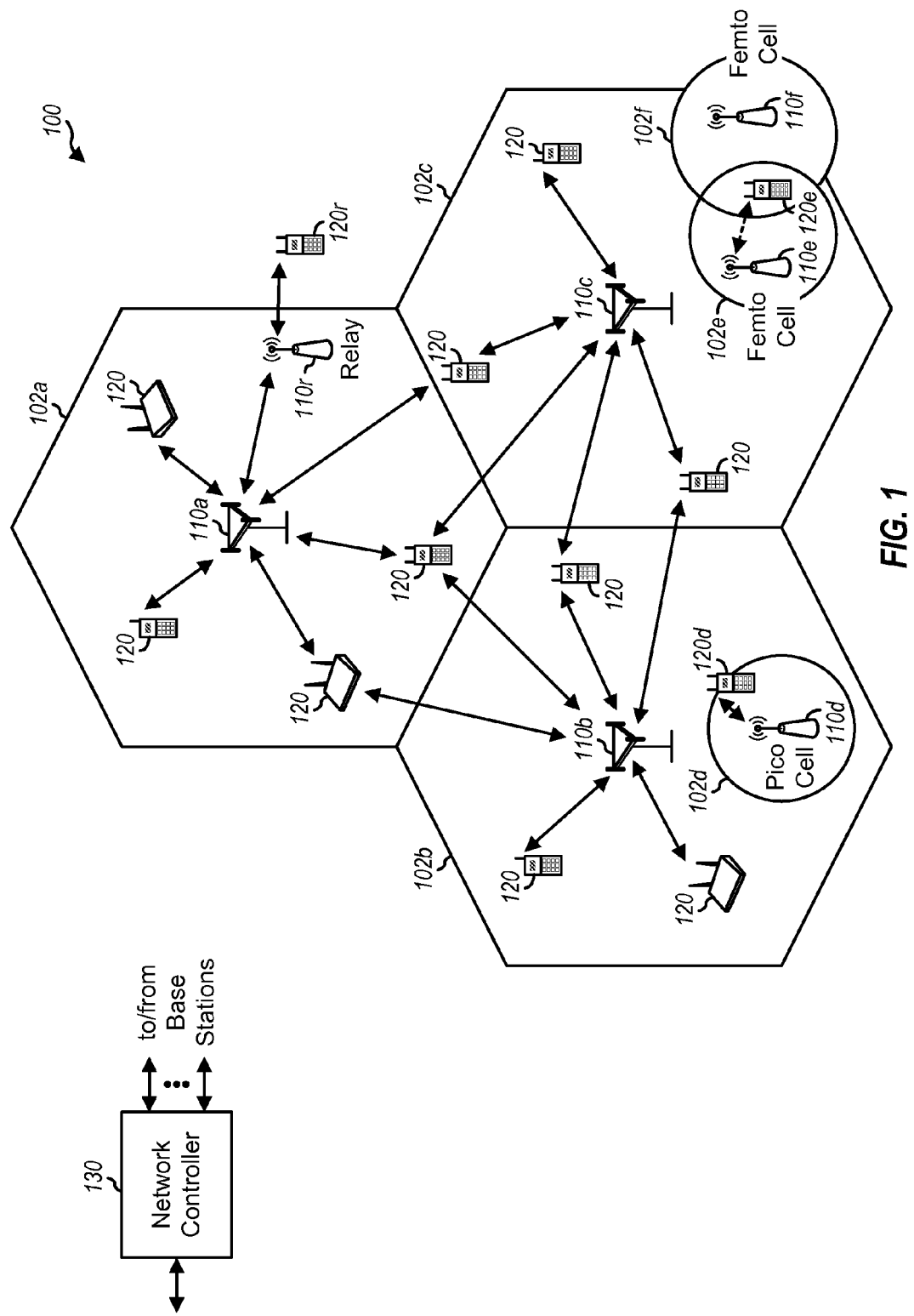
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be a station that communicates with the UEs and may also be referred to as a base station, a Node B, an access point, a node, etc. Each eNB 110 may provide communication coverage for a particular geographic area and may support communication for the UEs located within the coverage area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. eNB 110d may be a pico eNB for a pico cell 102d. eNBs 110e and 110f may be femto eNBs for femto cells 102e and 102f, respectively.

Wireless network 100 may also include relays. In the example shown in FIG. 1, a relay 110r may communicate with eNB 110a and a UE 120r in order to facilitate communication between eNB 110a and UE 120r.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a smartphone, a tablet, a personal digital assistant (PDA), a wireless modem, a wireless communication device, a handheld device, a laptop computer, a cordless phone, a wireless local loop (WLL) station, a netbook, a smartbook, etc. A UE may be able to communicate with macro eNBs, pico eNBs, femto eNBs, relays, etc.

LTE utilizes orthogonal frequency division multiplexing (OFDM) on the downlink and single-carrier frequency division multiplexing (SC-FDM) on the uplink. OFDM and SC-FDM partition a frequency range for a carrier into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the carrier bandwidth. For example, $N_{FFT}$ may be equal to 128, 256, 512, 1024 or 2048 for a carrier bandwidth of 1.4, 2.5, 5, 10 or 20 MHz, respectively. The carrier bandwidth may also be partitioned into a number of subbands, and each subband may cover a frequency range, e.g., 1.08 MHz.

The transmission timeline for each of the downlink and uplink may be partitioned into units of subframes. Each subframe may have a predetermined duration, e.g., one millisecond (ms), and may be partitioned into two slots. Each slot may include six symbol periods for an extended cyclic prefix or seven symbol periods for a normal cyclic prefix.

The available time-frequency resources for a carrier may be partitioned into resource blocks. The number of resource blocks available for a carrier in each slot may be dependent on the carrier bandwidth and may range from 6 to 110. Each resource block may cover 12 subcarriers in one slot and may include a number of resource elements. Each resource element may cover one subcarrier in one symbol period and may be used to send one modulation symbol, which may be a real or complex value.

Figure 2:
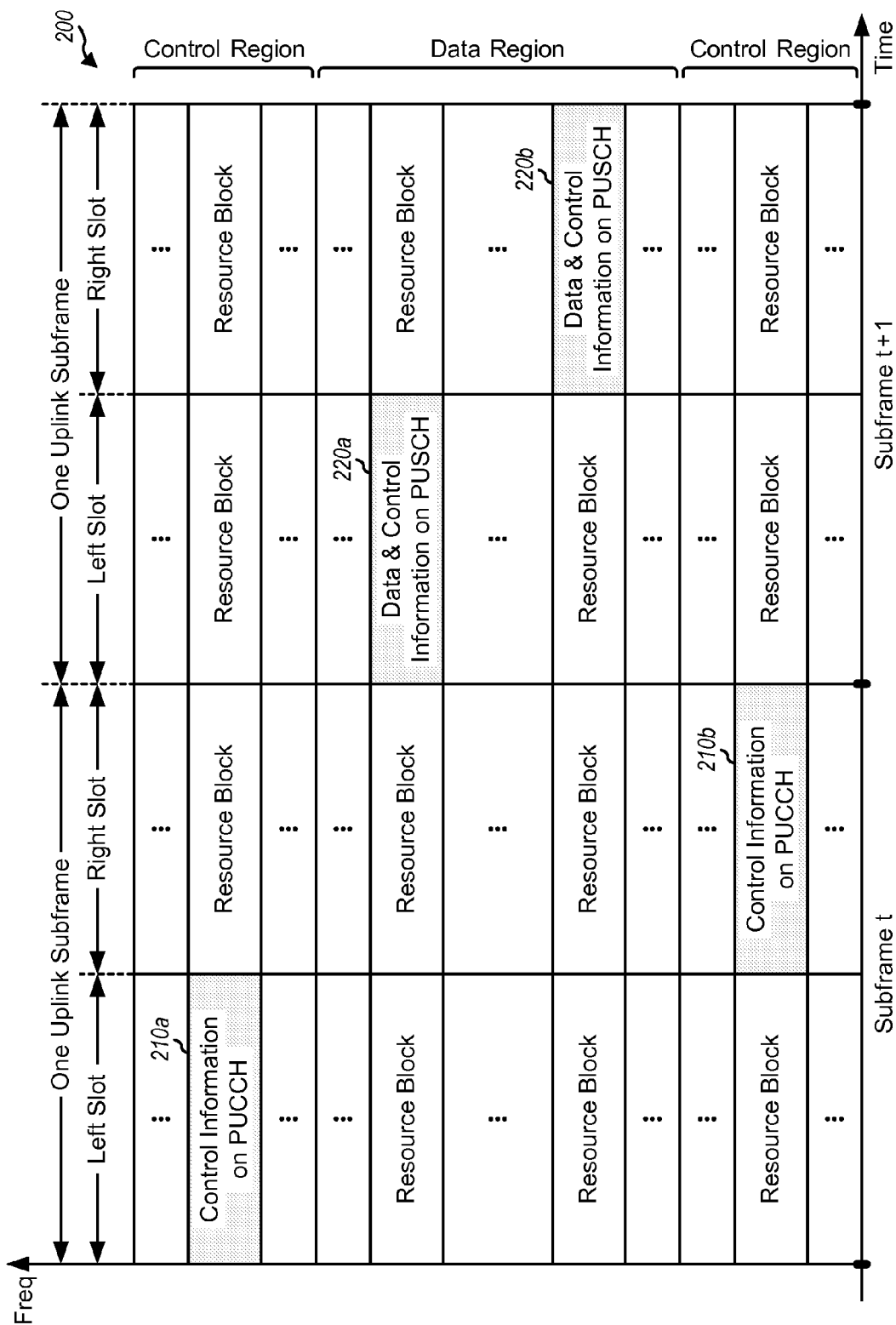
FIG. 2 shows an exemplary transmission structure for the uplink on one carrier.

FIG. 2 shows an exemplary transmission structure for the uplink on one CC in LTE. On the uplink, the available resource blocks may be partitioned into a data section and a control section. The control section may be formed at the two edges of the carrier bandwidth (as shown in FIG. 2) and may have a configurable size. The data section may include all resource blocks not included in the control section. A UE may be assigned two resource blocks 210a and 210b (or possibly more than two resource blocks) in the control region in two slots of one subframe to send control information on a Physical Uplink Control Channel (PUCCH). The two resource blocks may occupy different sets of subcarriers when frequency hopping is enabled, as shown in FIG. 2. The UE may be assigned two resource blocks 220a and 220b (or possibly more than two resource blocks) in the data region in two slots of one subframe to send only data or both data and control information on a Physical Uplink Shared Channel (PUSCH).

Wireless network 100 may support operation with multiple CCs, which may be referred to as carrier aggregation (CA) or multi-carrier operation. A UE may be configured with multiple CCs for the downlink and one or more CCs for the uplink for carrier aggregation. A carrier may also be referred to as a component carrier (CC), a cell, etc. The terms "carrier", "CC", and "cell" are used interchangeably herein. A carrier used for the downlink may be referred to as a downlink CC, and a carrier used for the uplink may be referred to as an uplink CC. An eNB may transmit data and control information on one or more downlink CCs to the UE. The UE may transmit data and control information on one or more uplink CCs to the eNB.

FIG. 3A shows an example of continuous carrier aggregation. K CCs may be available for communication and may be adjacent to each other, where K may be any integer value.

FIG. 3B shows an example of non-continuous carrier aggregation. K CCs may be available for communication and may be separate from each other.

Figure 4:
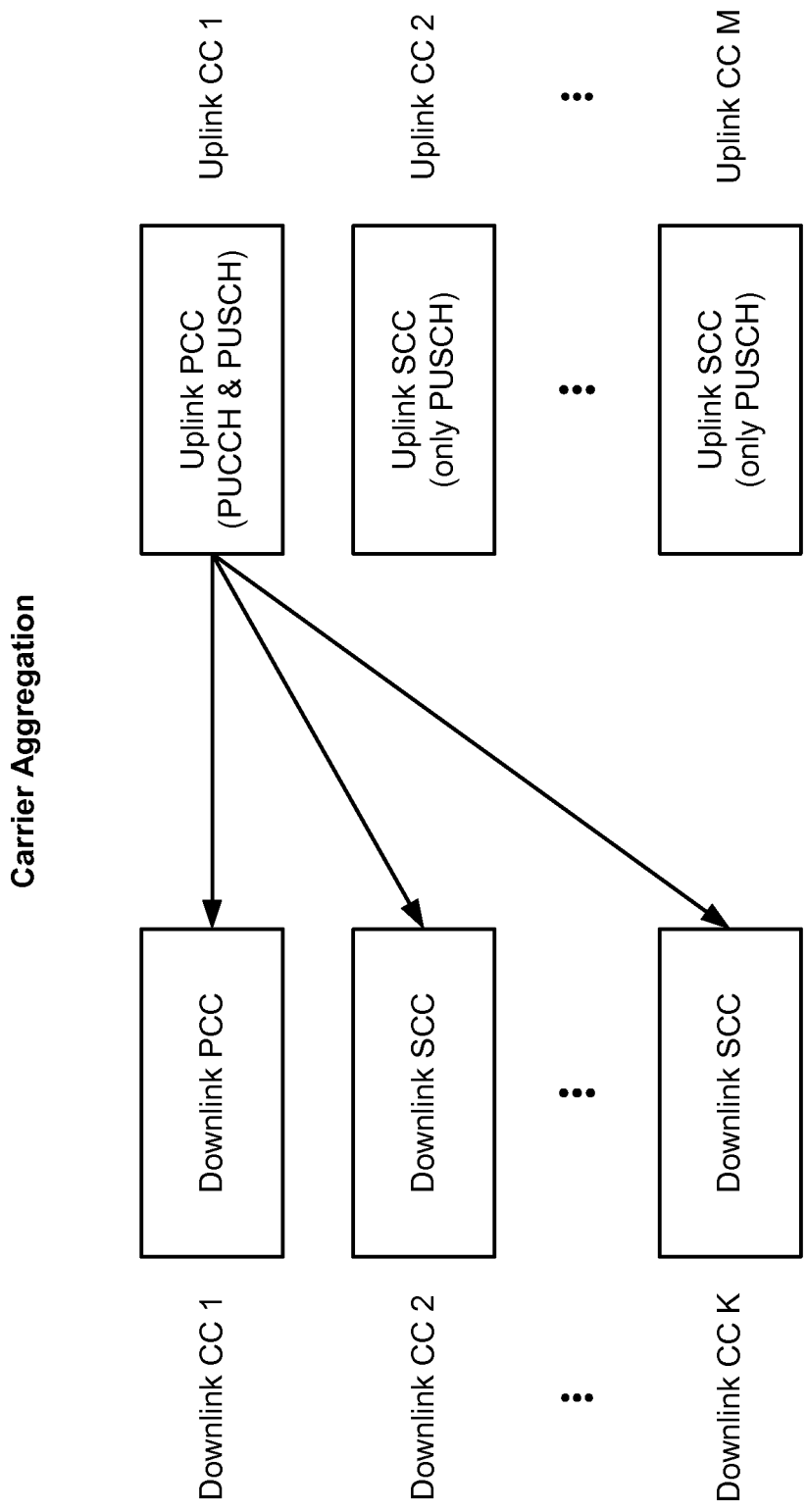
FIG. 4 shows an example of carrier aggregation.

FIG. 4 shows an example of carrier aggregation. A UE may be configured with K downlink CCs 1 through K and M uplink CCs 1 through M, where K>1 and M≥1 for carrier aggregation. In LTE Release 10, the UE may be configured with up to five CCs for each of the downlink and uplink for carrier aggregation. Each CC may have a bandwidth of up to 20 MHz and may be backward compatible with LTE Release 8. The UE may thus be configured with up to 100 MHz for up to five CCs on each of the downlink and uplink.

In one design, one downlink CC may be designated as a downlink primary CC (PCC), and each remaining downlink CC may be referred to as a downlink secondary CC (SCC). Similarly, one uplink CC may be designated as an uplink PCC, and each remaining uplink CC may be referred to as an uplink SCC. The downlink PCC and the uplink PCC may be semi-statically configured for the UE by higher layers such as Radio Resource Control (RRC). An eNB may transmit certain information on the downlink PCC to the UE, and the UE may transmit certain information on the uplink PCC to the eNB. In one design, the UE may transmit the PUSCH and/or PUCCH on the uplink PCC and may transmit only the PUSCH on an uplink SCC.

Wireless network 100 may support data transmission with hybrid automatic retransmission (HARQ) in order to improve reliability. For HARQ, a transmitter may send an initial transmission of a packet of data and may send one or more additional transmissions of the packet, if needed, until the packet is decoded correctly by a receiver, or the maximum number of transmissions of the packet has occurred, or some other termination condition is encountered. A packet may also be referred to as a transport block, a codeword, a data block, etc. After each transmission of the packet, the receiver may decode all received transmissions of the packet to attempt to recover the packet and may send an acknowledgement (ACK) if the packet is decoded correctly or a negative acknowledgement (NACK) if the packet is decoded in error. The transmitter may send another transmission of the packet if a NACK is received and may terminate transmission of the packet if an ACK is received. The transmitter may process (e.g., encode and modulate) the packet based on a modulation and coding scheme (MCS), which may be selected such that the packet can be decoded correctly with high probability after a target number of transmissions of the packet. This target number of transmissions may be referred to as a target termination.

A UE may report channel state information (CSI) for one or more downlink CCs to an eNB. CSI may include channel quality indicator (CQI), precoding matrix indicator (PMI), precoding type indicator (PTI), rank indicator (RI), and/or other information. RI for a downlink CC may indicate the number of layers (i.e., L layers, where L≥1) to use for transmission of data on the downlink CC. Each layer may be viewed as a spatial channel. PTI for a downlink CC may indicate a precoding type feedback (e.g., wideband versus subband). PMI for a downlink CC may indicate a precoding matrix or vector to use for precoding data prior to transmission on the downlink CC. CQI for a downlink CC may indicate a channel quality for each of at least one packet (e.g., P packets, where P≥1) to send on the downlink CC.

A UE may be configured to periodically send CSI for one or more downlink CCs to an eNB. CSI that is sent periodically may be referred to as periodic CSI (P-CSI). In one design, periodic CSI reporting may be separately configured for each downlink CC, and the UE may have different P-CSI reporting configurations for different downlink CCs. The P-CSI reporting configuration for each downlink CC may indicate which types of CSI (e.g., CQI, PMI, PTI, and/or RI) to report for that downlink CC, how often to report each type of CSI, the subframes in which to report each type of CSI, etc. In another design, a P-CSI reporting configuration may be applicable for a group of downlink CCs. In any case, the UE may periodically send CSI for each downlink CC based on the P-CSI reporting configuration applicable for that downlink CC. The UE may also be requested to send CSI for one or more downlink CCs in a given subframe via a CSI request. CSI sent in response to a CSI request may be referred to as aperiodic CSI (A-CSI).

Figure 5:
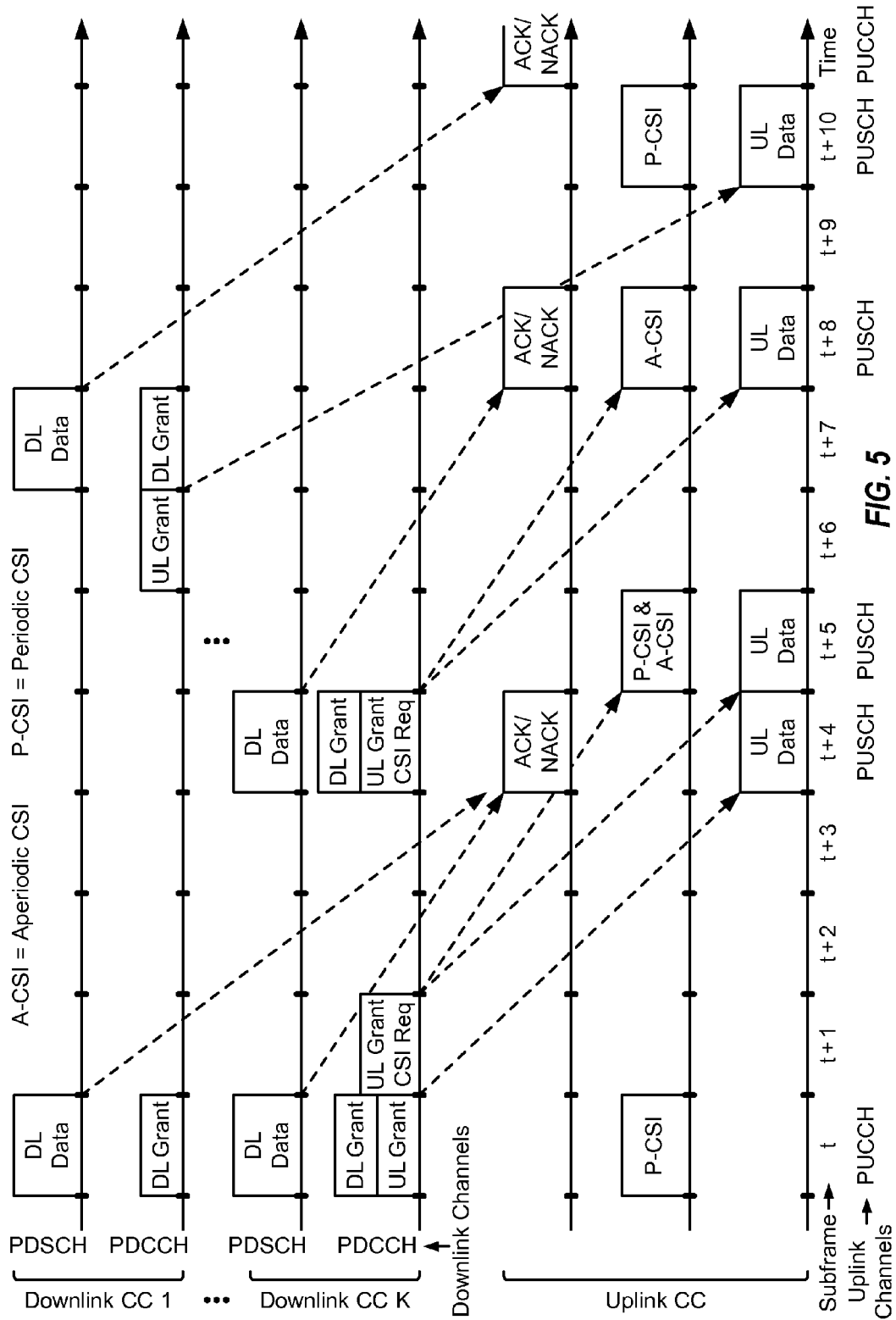
FIG. 5 shows data transmission and CSI reporting for multiple carriers.

FIG. 5 shows a scheme for data transmission on multiple (K) downlink CCs with HARQ and CSI reporting on one uplink CC. A UE may periodically estimate the channel quality of different downlink CCs for an eNB and may determine CSI for each downlink CC. The UE may periodically send CSI for each downlink CC based on a P-CSI reporting configuration for that downlink CC. The UE may also report CSI for each downlink CC for which CSI is requested.

The eNB may receive CSI for all downlink CCs from the UE. The eNB may use the CSI and/or other information to select the UE for data transmission, to schedule the UE on one or more downlink CCs and/or the uplink CC, and to select one or more modulation and coding scheme (MCSs) for each CC on which the UE is scheduled. The eNB may process (e.g., encode and modulate) one or more packets for each scheduled downlink CC based on one or more MCSs selected for that downlink CC. The eNB may then send a transmission of one or more packets on each scheduled downlink CC to the UE.

The UE may receive and decode the transmission of one or more packets on each scheduled downlink CC. The UE may determine whether each packet on each scheduled downlink CC is decoded correctly or in error. The UE may obtain an ACK for each packet decoded correctly and a NACK for each packet decoded in error. The UE may send ACK/NACK comprising any combination of ACKs and/or NACKs obtained for the packets received on all scheduled downlink CCs. The eNB may receive the ACK/NACK from the UE, may terminate transmission of each packet for which an ACK is received, and may send another transmission for each packet for which a NACK is received. The UE may also transmit data on the uplink CC to the eNB when there is data to send and the UE is scheduled for data transmission on the uplink CC.

As shown in FIG. 5, the eNB may send control information (e.g., a downlink grant and/or an uplink grant) on a Physical Downlink Control Channel (PDCCH) on a downlink CC to the UE. The eNB may send data on a Physical Downlink Shared Channel (PDSCH) on a downlink CC to the UE. The UE may send only control information (e.g., CSI and/or ACK/NACK) on the PUCCH on an uplink CC to the eNB. The UE may send only data or both data and control information on the PUSCH on an uplink CC to the eNB.

As shown in FIG. 5, the eNB may send a downlink (DL) grant for a data transmission on each downlink CC to the UE. The downlink grant may include various parameters to use to receive and decode the data transmission on a particular downlink CC. The eNB may also send an uplink (UL) grant for a data transmission from the UE on an uplink CC. The uplink grant may include various parameters to use to generate and send the data transmission on the uplink CC. The uplink grant may also include a CQI request. In this case, the UE may send CSI along with data on the uplink CC.

As shown in FIG. 5, the UE may transmit data and/or control information, or neither, in any given subframe. The control information may include CSI, ACK/NACK, a scheduling request (SR), some other information, or a combination thereof. In the example shown in FIG. 5, the UE may send P-CSI on the PUCCH in subframe t, send ACK/NACK and data on the PUSCH in subframe t+4, send CSI and data on the PUSCH in subframes t+5 and t+10, send CSI, ACK/NACK, and data on the PUSCH in subframe t+8, and send ACK/NACK on the PUCCH in subframe t+11.

In general, the UE may be configured with any number of downlink CCs and any number of uplink CCs for carrier aggregation. In one design, up to five downlink CCs may be mapped to a single uplink CC for 5:1 DL-to-UL CC mapping. In this design, the uplink CC may support transmission of control information for up to five downlink CCs. Data and control information may be sent on the uplink in various manners. In one design, the UE may send control information (e.g., CSI, ACK/NACK, and/or SR) on the PUCCH on the uplink PCC (but not an uplink SCC). The UE may send control information and data on the PUSCH on any uplink CC on which the UE is scheduled for data transmission. Data and control information may also be sent on the uplink in other manners.

The UE may be configured to periodically report CSI for K downlink CCs. The CSI reporting configuration for each downlink CC may specify a particular CSI reporting type to send for that downlink CC in each reporting subframe. A reporting subframe is a subframe in which P-CSI is reported. A number of CSI reporting types may be supported and may be prioritized as shown in Table 1. The CSI reporting types in Table 1 are referred to as "PUCCH reporting types" and are described in 3GPP TS 36.213, which is publicly available. In Table 1, priority 1 is the highest priority, and priority 3 is the lowest priority.

TABLE 1

CSI Reporting Types

| CSI Reporting Type | Priority | CSI to Report . . . |
|---|---|---|
| 1 | 3 | Subband CQI |
| 1a | 3 | Subband CQI and second PMI |
| 2 | 2 | Wideband CQI and PMI |
| 2a | 1 | Wideband CQI and first PMI |
| 2b | 2 | Wideband CQI and second PMI |
| 2c | 2 | Wideband CQI, first PMI, and second PMI |
| 3 | 1 | RI |
| 4 | 2 | Wideband CQI |
| 5 | 1 | RI and first PMI |
| 6 | 1 | RI and first PTI |

In one design, for P-CSI reporting, the K downlink CCs may be assigned priorities in a given reporting subframe based on the priorities of the CSI reporting types for the K downlink CCs in the reporting subframe. For example, downlink CCs with CSI reporting types 2a, 3, 5 and 6 may have the highest priority, downlink CCs with CSI reporting types 2, 2b, 2c and 4 may have the second highest priority, and downlink CCs with CSI reporting types 1 and 1a may have the lowest priority, as shown in Table 1. The priorities of the downlink CCs may change from reporting subframe to reporting subframe. If multiple downlink CCs have the same priority based on their CSI reporting types, then these downlink CCs may be further prioritized based on higher layers signaling (e.g., RRC signaling). The K downlink CCs may also be prioritized in other manners. For example, the downlink PCC may have the highest priority, and the downlink SCC(s) may have lower priorities. In one design, the same priority rules may apply to the K downlink CCs regardless of whether CSI is sent on the PUCCH or PUSCH.

The UE may be scheduled to report P-CSI for zero, one, or multiple downlink CCs in each subframe based on the P-CSI reporting configurations for the K downlink CCs. The UE may be able to report P-CSI for at most one downlink CC in each subframe. If the UE is scheduled to report P-CSI for multiple downlink CCs in a given subframe, then the UE may report P-CSI for the downlink CC with the highest priority and may drop (i.e., not report) P-CSI for the remaining downlink CCs. In this case, the UE may report P-CSI for only one downlink CC in a given subframe and may drop the remaining downlink CCs when there is a collision between multiple downlink CCs for which P-CSI is scheduled to be reported in the subframe.

The UE may send one P-CSI report for the highest priority downlink CC in a given subframe. The UE may be scheduled to report different types of CSI (e.g., RI, wideband CQI/PMI, subband CQI, etc.) for the highest priority downlink CC. In this case, the UE may select which type of CSI to report based on rules described in 3GPP TS 36.213.

The UE may report CSI whenever requested, e.g., as shown in FIG. 5. A CSI request may be included in an uplink grant, which may be sent in a common search space for the UE. A CSI request may also be sent to the UE in other manners. The UE may determine which downlink CC(s) to report CSI based on a CSI request in various manners.

In one design, a CSI request may include two bits, which may be defined as follows:
  "00"—indicates CSI is not requested,
  "01"—indicates CSI is requested for one or more downlink CCs that are linked to an uplink CC on which CSI is sent,
  "10"—indicates CSI is requested for a first set of downlink CCs configured by RRC, and
  "11"—indicates CSI is requested for a second set of downlink CCs configured by RRC.

Each downlink CC may be linked to one uplink CC, e.g., based on RRC signaling sent to the UE, or a system information block (SIB) broadcast to all UEs, or signaling sent in other manners. The UE may also be configured with a first set of downlink CCs and possibly a second set of downlink CCs for CSI reporting, e.g., via RRC signaling. Each set may include up to 5 downlink CCs. If the CSI request is "01", then the UE may determine the downlink CC(s) linked to the uplink CC carrying the CSI report and may report CSI for the linked downlink CC(s). If the CSI request is "10" or "11", then the UE may report CSI for the first or second set of downlink CCs configured for the UE. The CSI request may thus indicate one or more specific downlink CCs for which CSI is requested.

In another design, a CSI request may include one bit, which may be defined as follows:
  "0"—indicates CSI is not requested, and
  "1"—indicates CSI is requested for a set of downlink CCs configured by RRC.

The UE may be scheduled to report P-CSI for multiple downlink CCs in a given subframe. In this case, the UE may report P-CSI for the highest priority downlink CC and may drop the P-CSI for the remaining downlink CCs, as described above. The UE may also be scheduled to report both P-CSI and A-CSI in a given subframe. In this case, the UE may report A-CSI as requested and may drop P-CSI.

The UE may frequently drop P-CSI for various reasons. First, the UE may drop P-CSI whenever there is collision between multiple downlink CCs, since the UE may be able to report P-CSI for only one downlink CC in a given subframe. Second, the UE may drop P-CSI whenever there is collision between multiple types of CSI (e.g., RI and CQI) to report for a downlink CC in a given subframe. Third, the UE may drop P-CSI whenever there is collision between P-CSI and ACK/NACK for multiple downlink CCs in a given subframe. The UE may need to send ACK/NACK for multiple downlink CCs as well as P-CSI on the PUCCH and may not be configured for simultaneous transmission of the PUCCH and PUSCH. The UE may be able to simultaneously send P-CSI and ACK/NACK for one downlink CC on the PUCCH if a parameter simultaneousAckNackAndCQI is set to "True" for the UE. However, this may not be applicable when the UE has ACK/NACK for multiple downlink CCs. The UE may then drop P-CSI, regardless of whether the UE is capable of supporting simultaneous transmission of ACK/NACK and CSI. The UE may also drop P-CSI due to other reasons.

Frequently dropping P-CSI may result in long reporting periodicity and delay for P-CSI, which may adversely impact scheduling of downlink data transmission and downlink throughput. The adverse impact due to frequently dropping P-CSI may be mitigated by requesting A-CSI more often. However, higher overhead would be incurred in order to send CSI requests on the PDCCH. The higher overhead may be undesirable.

In an aspect of the present disclosure, a UE may be configured with a plurality of PUCCH formats for sending control information in different subframes in order to reduce or avoid dropping P-CSI due to collisions. Different PUCCH formats may be associated with different capacities. This would enable the UE to send P-CSI for multiple downlink CCs, to send P-CSI and ACK/NACK for multiple downlink CCs, etc.

The UE may have different CSI reporting configurations for the K downlink CCs, as described above. Depending on the CSI reporting configurations and the number of downlink CCs for the UE, there may be some subframes without any collision with respect to P-CSI, some subframes with collision between two downlink CCs for P-CSI, some subframes with collision between three downlink CCs for P-CSI, etc. A collision between multiple downlink CCs for P-CSI may occur when the UE is scheduled to report P-CSI for these downlink CCs in one subframe. The collision between multiple downlink CCs may be for (i) the same reporting type, with the same type of CSI to be reported for the multiple downlink CCs, or (ii) different reporting types, with different types of CSI to be reported for the multiple downlink CCs. In any case, collisions between multiple downlink CCs for P-CSI in different subframes may be ascertained based on the CSI reporting configurations for the K downlink CCs.

In one design, the UE may be configured with multiple PUCCH formats of different capacities. These PUCCH formats may or may not be associated with different multiplexing capabilities. Multiplexing capability refers to the ability to send information from different UEs using the same set of resources. In one design, the UE may be configured with two or more of the PUCCH formats listed in Table 2. Other PUCCH formats may also be supported.

TABLE 2

PUCCH Formats

| PUCCH Format | Capacity (# of Info Bits) | Description |
|---|---|---|
| 1a | 1 | Used to send 1-bit ACK/NACK on PUCCH. |
| 1b | 2 | Used to send 2-bit ACK/NACK on PUCCH. |
| 2 | 10 | Used to send up to 10 bits of CSI on PUCCH. |
| 2a | 11 | Used to send up to 10 bits of CSI and 1-bit ACK/NACK on PUCCH. |
| 2b | 12 | Used to send up to 10 bits of CSI and 2-bit ACK/NACK on PUCCH. |
| 3 | 21 | Used to send up to 21 bits of CSI and/or ACK/NACK on PUCCH. |
| 4 | N | Used to send up to N bits of CSI and/or ACK/NACK (N > 21) on PUCCH or PUSCH in one pair of resource blocks. |
| 5 | 2N | Used to send up to 2N bits of CSI and/or ACK/NACK on PUCCH or PUSCH in two pairs of resource blocks. |

PUCCH formats 1a to 3 are described in 3GPP TS 36.213. For PUCCH format 4, physical layer parameters (e.g., coding, modulation, etc.) for sending control information may be the same as, or similar to, those for traffic data sent on PUSCH. For example, a set of information bits may be encoded to generate a set of code bits, which may be mapped to a set of modulation symbols (e.g., based on QPSK). The modulation symbols may be mapped to resource elements in one pair of resource blocks in the control region or the data region. The capacity of PUCCH format 4 may be dependent on the code rate and modulation scheme used for PUCCH format 4 and the number of resource elements available to send control information in the pair of resource blocks. PUCCH format 5 may be similar to PUCCH format 4 but may be sent on more resource blocks, e.g., twice the number of resource blocks. PUCCH formats 4 and 5 may be referred to as PUSCH-like formats.

In one design, control information may be sent on the PUCCH with PUCCH formats 1a to 3. Control information (and no data) may be sent on the PUSCH with PUCCH formats 4 and 5. In another design, control information may be sent on the PUCCH with PUCCH formats 1a to 5.

In general, a UE may be configured with Q PUCCH formats of different capacities, where Q may be any integer value greater than one. One PUCCH format may be used in each reporting subframe and may be selected based on one or more criteria. In one design, a PUCCH format may be selected for each reporting subframe based on the total payload size of CSI and/or other control information to send in the subframe. For example, a first PUCCH format may be used in subframes without any P-CSI collision, a second PUCCH format may be used in subframes with P-CSI collision and a total payload size of less than a first threshold, a third PUCCH format may be used in subframes with P-CSI collision and a total payload size of less than a second threshold, etc. A PUCCH format may be selected for each reporting subframe based on other criteria and/or rules. For example, a PUCCH format may be selected for each reporting subframe based on whether P-CSI collision occurred, the CSI reporting type(s) for each downlink CC to be reported in the subframe, the capacities of the available PUCCH formats, etc.

In one scheme, a PUCCH format may be selected for each reporting subframe based on P-CSI collision, i.e., based on whether there is collision among downlink CCs to report CSI in the subframe. In one design, PUCCH format 3 may be selected for subframes in which there is no P-CSI collision among downlink CCs. P-CSI and ACK/NACK may be multiplexed and sent on the PUCCH using PUCCH format 3. PUCCH format 4 may be selected for subframes in which there is P-CSI collision among downlink CCs. In another design, PUCCH format 2/2a/2b may be selected for subframes in which there is no P-CSI collision among downlink CCs. P-CSI and 1 or 2 bits of ACK/NACK may be multiplexed and sent on the PUCCH using PUCCH format 2/2a/2b. PUCCH format 4 may be selected for subframes in which there is P-CSI collision among downlink CCs.

In another scheme, a PUCCH format may be selected for each reporting subframe based on the number of downlink CCs to report CSI and/or the total payload size for the subframe. In subframes with no P-CSI collision, PUCCH format 3 may be used to send P-CSI for one downlink CC and possibly ACK/NACK for all K downlink CCs. In subframes with P-CSI collision but the total number of colliding downlink CCs or the total payload size is sufficiently small (e.g., less than a predetermined threshold), PUCCH format 3 may be used to send P-CSI and possibly ACK/NACK for all downlink CCs. In subframes with P-CSI collision and the total number of colliding downlink CCs or the total payload size is sufficiently large (e.g., greater than the predetermined threshold), PUCCH format 4 may be used to send P-CSI and possibly ACK/NACK for all downlink CCs.

Figure 6:
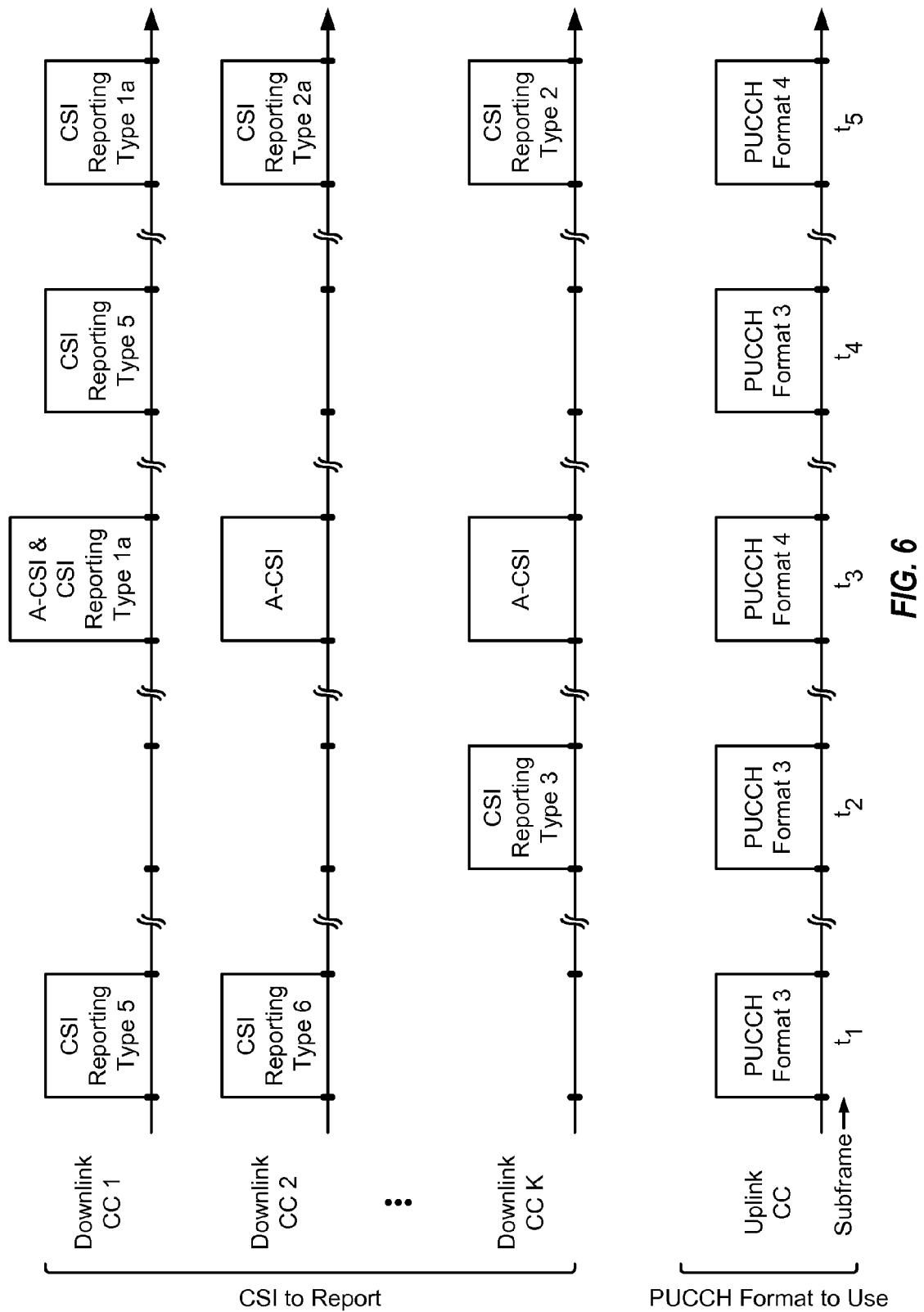
FIG. 6 shows an example of reporting CSI using different control channel formats.

A PUCCH format may also be selected for each reporting subframe in other manners, e.g., based on other criterion, other combinations of criteria, other rules, etc. In one design, the UE and its serving eNB may both be able to determine which PUCCH format to use in each reporting subframe based on the P-CSI reporting configurations for the UE for all downlink CCs and the specific criteria and/or rules for selecting the PUCCH format in each reporting subframe. The UE may autonomously determine a PUCCH format to use for each reporting subframe. The UE may send CSI for all downlink CCs and possibly other control information using the determined PUCCH format. The serving eNB may similarly determine the PUCCH format used by the UE in each reporting subframe. The serving eNB may receive CSI for all downlink CCs and possibly other control information from the UE based on the determined PUCCH format FIG. 6 shows an example of reporting CSI for K downlink CCs using different PUCCH formats. A UE may have different CSI reporting configurations for the K downlink CCs. The CSI reporting configuration for downlink CC 1 may direct the UE to send CSI reporting type 5 (RI and first PMI) in subframe $t_1$, CSI reporting type 1a (subband CQI and second PMI) in subframe $t_3$, CSI reporting type 5 in subframe CSI reporting type 1a in subframe $t_5$, etc. The CSI reporting configuration for downlink CC 2 may direct the UE to send CSI reporting type 6 (RI and PTI) in subframe $t_1$, CSI reporting type 2a (wideband CQI) in subframe $t_5$, etc. The CSI reporting configuration for downlink CC K may direct the UE to send CSI reporting type 3 (only RI) in subframe $t_2$, CSI reporting type 2 (wideband CQI and PMI) in subframe $t_5$, etc. The UE may receive a CSI request for all K downlink CCs in subframe $t_3$.

In the example shown in FIG. 6, the UE may be configured with PUCCH formats 3 and 4 for sending CSI and possibly ACK/NACK. The UE may use PUCCH format 3 to send (i) P-CSI for downlink CCs 1 and 2 in subframe $t_1$ and (ii) P-CSI for only downlink CC K in subframe $t_2$. The UE may use PUCCH format 4 having higher capacity to send A-CSI for all K downlink CCs and possibly P-CSI for downlink CC 1 in subframe $t_3$. The UE may use PUCCH format 3 to send P-CSI for downlink CC 1 in subframe $t_4$. The UE may use PUCCH format 4 to send P-CSI for downlink CCs 1, 2 and K in subframe $t_5$. The UE may thus use different PUCCH formats in different reporting subframes to send P-CSI and/or A-CSI for all downlink CCs of interest.

FIG. 6 shows an exemplary design in which different PUCCH formats are used in different CSI reporting subframes depending on the P-CSI and/or A-CSI to report. Different PUCCH formats may also be selected based on other criteria such as whether there is ACK/NACK to send, the capacities of different PUCCH formats, the number of CCs for which to send CSI and/or ACK/NACK, some other criteria, or a combination thereof. In one design, PUCCH format 2/2a/2b may be selected to send only ACK/NACK, and PUCCH format 3 (or PUCCH format 4) may be selected to send only CSI or both CSI and ACK/NACK.

In one design, each PUCCH format may be associated with specific resources to use to send control information based on that PUCCH format. PUCCH format 1a to 3 may be associated with resources for the PUCCH, and PUCCH formats 4 and 5 may be associated with resources for the PUSCH. The PUCCH resources for PUCCH formats 1a to 3 may be explicitly or implicitly conveyed, e.g., may be linked to the PDCCH carrying a grant. The PUSCH resources for PUCCH formats 4 and 5 may be implicitly conveyed (e.g., linked to the PUCCH) or explicitly conveyed (e.g., semi-statically configured for the UE). The resources for the supported PUCCH formats may also be defined and conveyed in other manners.

In one design, the PUCCH format may vary from reporting subframe to reporting subframe in a semi-static manner. The specific PUCCH format to use in a given reporting subframe may be deterministic and may be ascertained based on the P-CSI reporting configurations, the number of activated downlink CCs, etc. The P-CSI reporting configurations may be defined by higher layers (e.g., RRC). The UE and the serving eNB may be aligned with respect to which PUCCH format to use for CSI feedback in a given subframe. The eNB may have the flexibility to configure different UEs such that PUCCH resources for different PUCCH formats can be shared among different UEs in a time division multiplexed (TDM) manner. The eNB may also have the flexibility of reusing the reserved but unused PUCCH resources (which are known to the eNB) for PUSCH transmissions by other UEs In another design, the PUCCH format may vary from reporting subframe to reporting subframe in a more dynamic manner. For example, the PUCCH format to use in a given reporting subframe may be determined based on the P-CSI reporting configurations, the number of activated downlink CCs, the presence of absence of ACK/NACK feedback, the number of ACK/NACK bits to send, the downlink CCs for which the ACK/NAK bits are intended, etc. In this design, the UE may select a PUCCH format for a reporting subframe based on the applicable criteria. The eNB may perform decoding for different possible PUCCH formats, e.g., to account for different numbers of ACK/NACK bits determined by the UE and the eNB.

The techniques described herein may be used to send control information (e.g., CSI and/or ACK/NACK) for carrier aggregation, as described above. The techniques can support reporting of CSI for one or more downlink CCs in a given subframe, so that dropping of P-CSI may be reduced or avoided.

The techniques may also be used to send control information for coordinated multi-point (CoMP) transmission. For CoMP, multiple cells may coordinate to transmit data to one or more UEs on the same time-frequency resource such that the signals from the multiple cells can be combined at a target UE and/or inter-cell interference can be reduced at an interfered UE. Joint processing, dynamic switching, or coordinated beamforming may be used for CoMP transmission. For joint processing, multiple cells may transmit data to one or more UEs with precoding vectors at different cells being selected to achieve beamforming gain at a target UE and/or interference reduction at one or more interfered UEs served by one or more neighbor cells. For dynamic switching, one cell may transmit data to a target UE in one subframe, while another cell may transmit data to the same UE in a different subframe. For coordinated beamforming, a single cell may transmit data to a target UE with one or more precoding vectors selected for the cell by trading between beamforming gain to the target UE and interference reduction to one or more interfered UEs. For joint processing, dynamic switching, and coordinated beamforming, the precoding vector(s) used by one or more cells to transmit data to the target UE may be selected by considering the wireless channels of the target UE as well as the wireless channels of other UE(s) in order to reduce inter-cell interference.

To support CoMP, a UE may have a CoMP measurement set, which may include all cells that can be measured by the UE and can participate in CoMP transmission to the UE. These cells may belong to the same eNB or different eNBs and may be selected based on channel gain, pathloss, received signal strength, received signal quality, etc. For example, the CoMP measurement set may include cells with channel gain or received signal quality above a threshold. The UE may determine and report CSI for the cells in the CoMP measurement set. In one design, the UE may have different P-CSI reporting configurations for different cells in the CoMP measurement set. The UE may report P-CSI for one or more cells in a given subframe based on the P-CSI reporting configurations for these cells. The UE may also report A-CSI for one or more cells in a given subframe when requested. With regard to CSI feedback, multiple cells in a CoMP measurement set may be analogous to multiple carriers in carrier aggregation.

The techniques described herein may also be used to send control information in other scenarios in which multiple P-CSI reporting configurations are present. These P-CSI reporting configurations may be for different carriers in carrier aggregation, different cells in CoMP, different transmitter entities in a relay scenario, etc. A UE may be configured with different PUCCH formats in different reporting subframes. The PUCCH format for each reporting subframe may be selected, e.g., based on the criteria and/or rules described above.

In one design, the techniques may be selectively applied in certain scenarios but not other scenarios. For example, the techniques may be applied when a UE is configured with (i) at least three downlink CCs in an FDD system or (ii) at least two downlink CCs in a TDD system. As another example, the techniques may be applied for only UEs that can support certain PUCCH formats (e.g., PUCCH format 3), or only UEs capable of aggregating at least three downlink CCs for FDD or at least two downlink CCs for TDD, or UEs defined in other manners.

The techniques described herein may provide various advantages. First, P-CSI may be dropped less frequently, or not at all, by using different PUCCH formats in different reporting subframes. Second, overhead to send control information on the uplink may be reduced by using different PUCCH formats in different reporting subframes. A suitable PUCCH format may be selected for each reporting subframe based on the amount of control information to send in the subframe. In contrast, using a single PUCCH format (e.g., PUCCH format 3) with a small capacity may result in frequent dropping of P-CSI. Using a single PUCCH format with a large capacity (e.g., PUCCH format 4) may result in high overhead and waste of resources when the large capacity is not required.

Figure 7:
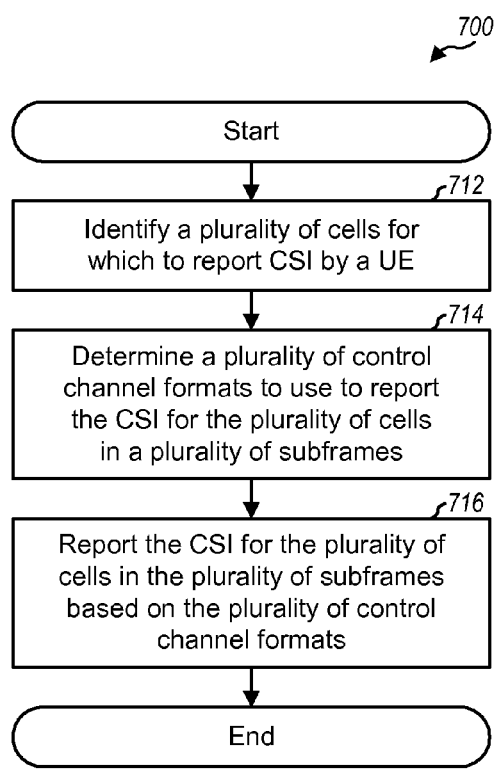
FIG. 7 shows a process for reporting CSI.

FIG. 7 shows a design of a process 700 for reporting CSI. Process 700 may be performed by a UE (as described below) or by some other entity. The UE may identify a plurality of cells for which to report CSI by the UE (block 712). In one design, for carrier aggregation, the plurality of cells may correspond to a plurality of carriers (e.g., up to five carriers) configured for the UE and on which the UE can be scheduled for data transmission. In another design, for CoMP, the plurality of cells may correspond to a plurality of transmitting entities that can transmit data to the UE.

The UE may determine a plurality of control channel formats to use to report the CSI for the plurality of cells in a plurality of subframes (block 714). The plurality of control channel formats may correspond to the PUCCH formats described above. The plurality of control channel formats may be associated with at least two different capacities. In one design, the plurality of control channel formats may include a first control channel format for the PUCCH (e.g., PUCCH format 3) and a second control channel format for the PUSCH (e.g., PUCCH format 4). In another design, the plurality of control channel formats may include multiple control channel formats for the PUCCH (e.g., PUCCH format 2/2a/2b and PUCCH format 3).

The UE may report the CSI for the plurality of cells in the plurality of subframes based on the plurality of control channel formats (block 716). In one design, the UE may determine which CSI to report for the plurality of cells in a subframe, determine a control channel format to use in the subframe, and send the CSI in the subframe based on the control channel format.

In one design of block 714, the UE may determine a plurality of CSI reporting configurations for the UE for the plurality of cells. A CSI reporting configuration for each cell may indicate a schedule of periodic reporting of at least one type of CSI for the cell. The UE may determine CSI to report for the plurality of cells in each of the plurality of subframes based on the plurality of CSI reporting configurations. The UE may ascertain the plurality of control channel formats to use based on the CSI to report for the plurality of cells in each subframe. In another design, the UE may ascertain the plurality of control channel formats to use based on ACK/NACK for the plurality of cells, or capacities of the plurality of control channel formats, or the number of cells configured for CSI reporting by the UE, and/or other factors.

The plurality of control channel formats may comprise first and second control channel formats (e.g., PUCCH format 2/2a/2b and 3, or PUCCH formats 3 and 4). In one design, the UE may select the first control channel format if a total payload size for the CSI to report in a subframe is less than a threshold. The UE may select the second control channel format if the total payload size for CSI to report in the subframe is greater than the threshold. In another design, the UE may select the first control channel format if CSI is reported for only one cell. The UE may select the second control channel format if CSI is reported for at least two cells. The UE may also select the first or second control channel format based on other criteria and/or rules. The plurality of control channel formats may comprise one or more additional control channel formats. The UE may then select a suitable control channel format for a subframe from among all available control channel formats.

Figure 8:
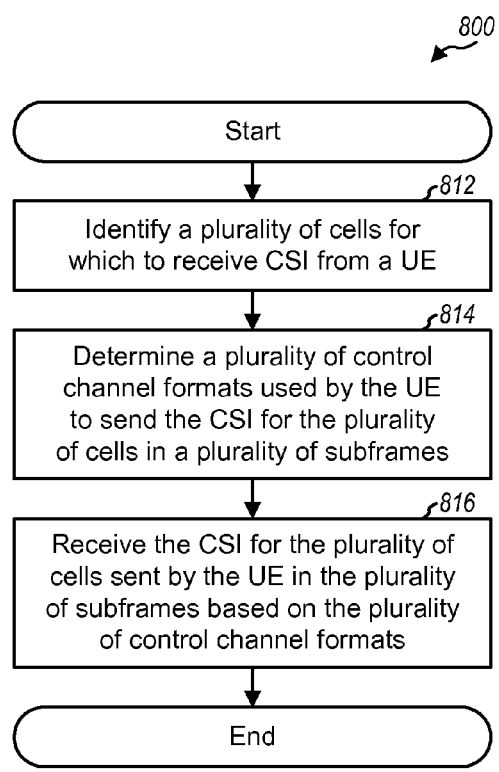
FIG. 8 shows a process for receiving CSI.

FIG. 8 shows a design of a process 800 for receiving CSI. Process 800 may be performed by a base station/eNB (as described below) or by some other entity. The base station may identify a plurality of cells for which to receive CSI from a UE (block 812). In one design, for carrier aggregation, the plurality of cells may correspond to a plurality of carriers (e.g., up to five carriers) configured for the UE and on which the UE can be scheduled for data transmission. In another design, for CoMP, the plurality of cells may correspond to a plurality of transmitting entities that can transmit data to the UE for CoMP transmission.

The base station may determine a plurality of control channel formats used by the UE to send the CSI for the plurality of cells in a plurality of subframes (block 814). The base station may receive the CSI for the plurality of cells sent by the UE in the plurality of subframes based on the plurality of control channel formats (block 816). In one design, the base station may determine CSI to be reported by the UE for the plurality of cells in a subframe, determine a control channel format used by the UE in the subframe, and receive the CSI in the subframe based on the control channel format.

In one design of block 814, the base station may determine a plurality of CSI reporting configurations for the UE for the plurality of cells. The base station may determine CSI to be reported for the plurality of cells by the UE in each of the plurality of subframes based on the plurality of CSI reporting configurations. The base station may ascertain the plurality of control channel formats used by the UE based on the CSI to be reported by the UE in each subframe. In another design, the base station may ascertain the plurality of control channel formats used by the UE based on ACK/NACK for the plurality of cells, or capacities of the plurality of control channel formats, or the number of cells configured for CSI reporting by the UE, and/or other factors.

The plurality of control channel formats may comprise first and second control channel formats (e.g., PUCCH formats 3 and 4). In one design, the base station may select the first control channel format if a total payload size for the CSI to be reported in a subframe is less than a threshold. The base station may select the second control channel format if the total payload size for the CSI to be reported in the subframe is greater than the threshold. In another design, the base station may select the first control channel format if CSI is reported for only one cell. The base station may select the second control channel format if CSI is reported for at least two cells. The base station may also select the first or second control channel format based on other criteria and/or rules. The plurality of control channel formats may comprise one or more additional control channel formats. The base station may then select a suitable control channel format for a subframe from among all available control channel formats.

Figure 9:
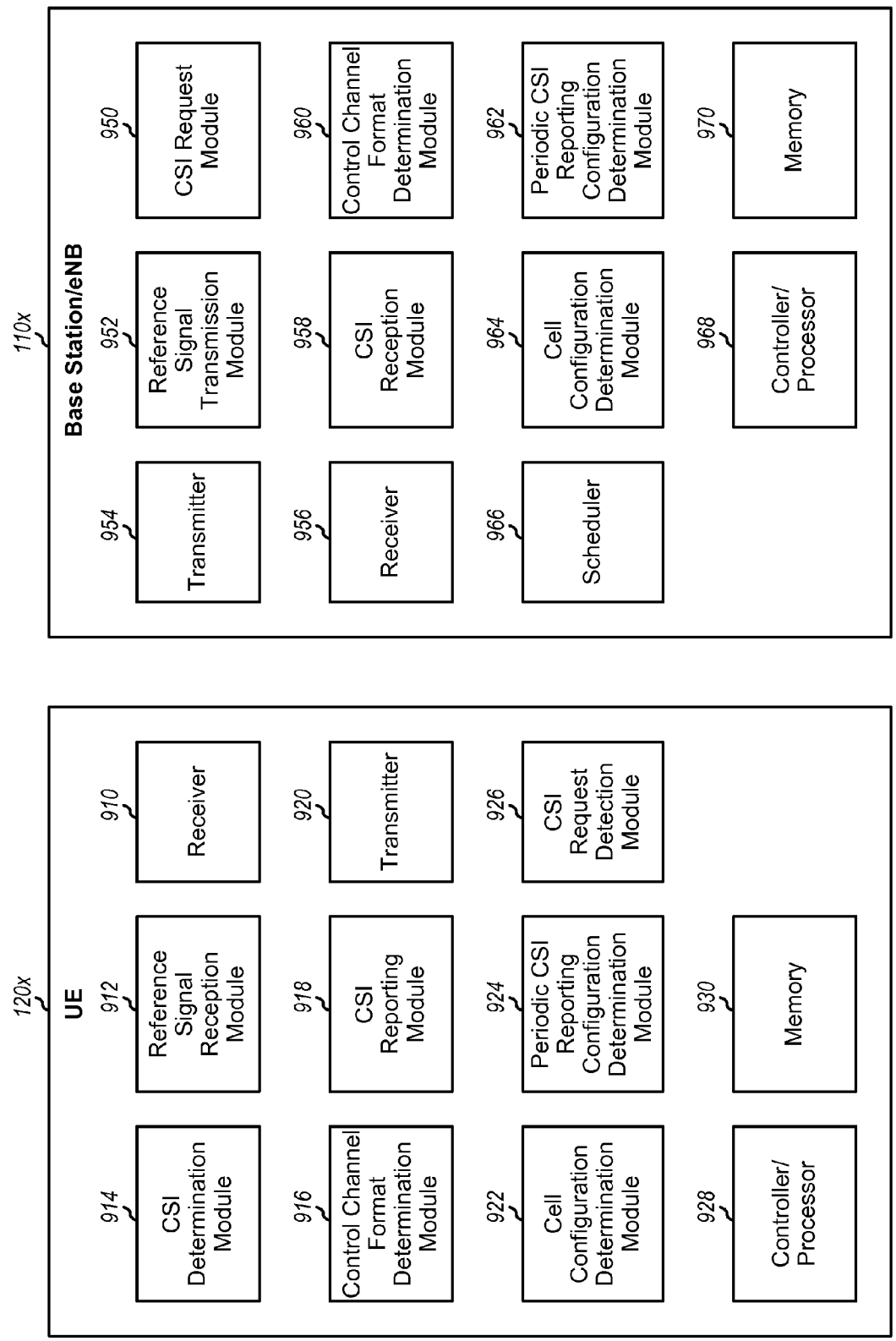
FIG. 9 shows a block diagram of a design of a UE and a base station.

FIG. 9 shows a block diagram of a design of a UE 120x and a base station/eNB 110x, which may be one of the UEs and one of the eNBs in FIG. 1. At UE 120x, a receiver 910 may receive signals transmitted by base stations and/or other transmitting entities. A module 912 may receive reference signals and may make measurements based on the reference signals. The reference signals may include cell-specific reference signals (CRS), CSI reference signals (CSI-RS), etc. A module 914 may determine CSI (e.g., CQI, PMI, CDI, PTI, RI, etc.) for cells (e.g., carriers) of interest based on the measurements. A module 916 may determine a PUCCH format to use to send CSI and/or other information in each subframe. Module 918 may report CSI for all cells in a subframe based on the PUCCH format to use in the subframe. A transmitter 920 may transmit the CSI for all cells and possibly other information.

A module 922 may determine configuration of cells for UE 120x, e.g., configuration of CCs for carrier aggregation, configuration of transmitting entities for CoMP, etc. A module 924 may determine a periodic CSI reporting configuration for each cell configured for UE 120x. A module 926 may detect for CSI requests sent to UE 120x. Module 916 may determine the PUCCH format for each subframe based on the periodic CSI configurations for all cells, the CSI requests, etc. The various modules within UE 120x may operate as described above. A controller/processor 928 may direct the operation of various modules within UE 120x. A memory 930 may store data and program codes for UE 120x.

At base station 110x, a module 952 may generate reference signals. A module 950 may send CSI requests to UE 120x and/or other UEs. A transmitter 954 may transmit the reference signals, the CSI requests, other control information, and data to UEs. A receiver 956 may receive signals transmitted by UE 120x and other UEs. A module 958 may receive messages from UE 120x and extract CSI for cells configured for UE 120x. A module 960 may determine a PUCCH format used by UE 120x for sending CSI and/or other information in each subframe.

A module 962 may determine configuration of cells for UE 120x, e.g., configuration of CCs for carrier aggregation, configuration of transmitting entities for CoMP, etc. A module 964 may determine a periodic CSI reporting configuration for each cell configured for UE 120x. Module 960 may determine the PUCCH format for each subframe based on the periodic CSI configurations for all cells, the CSI requests, etc. The various modules within base station 110x may operate as described above. A scheduler 966 may schedule UEs for data transmission. A controller/processor 968 may direct the operation of various modules within base station 110x. A memory 970 may store data and program codes for base station 110x.

Figure 10:
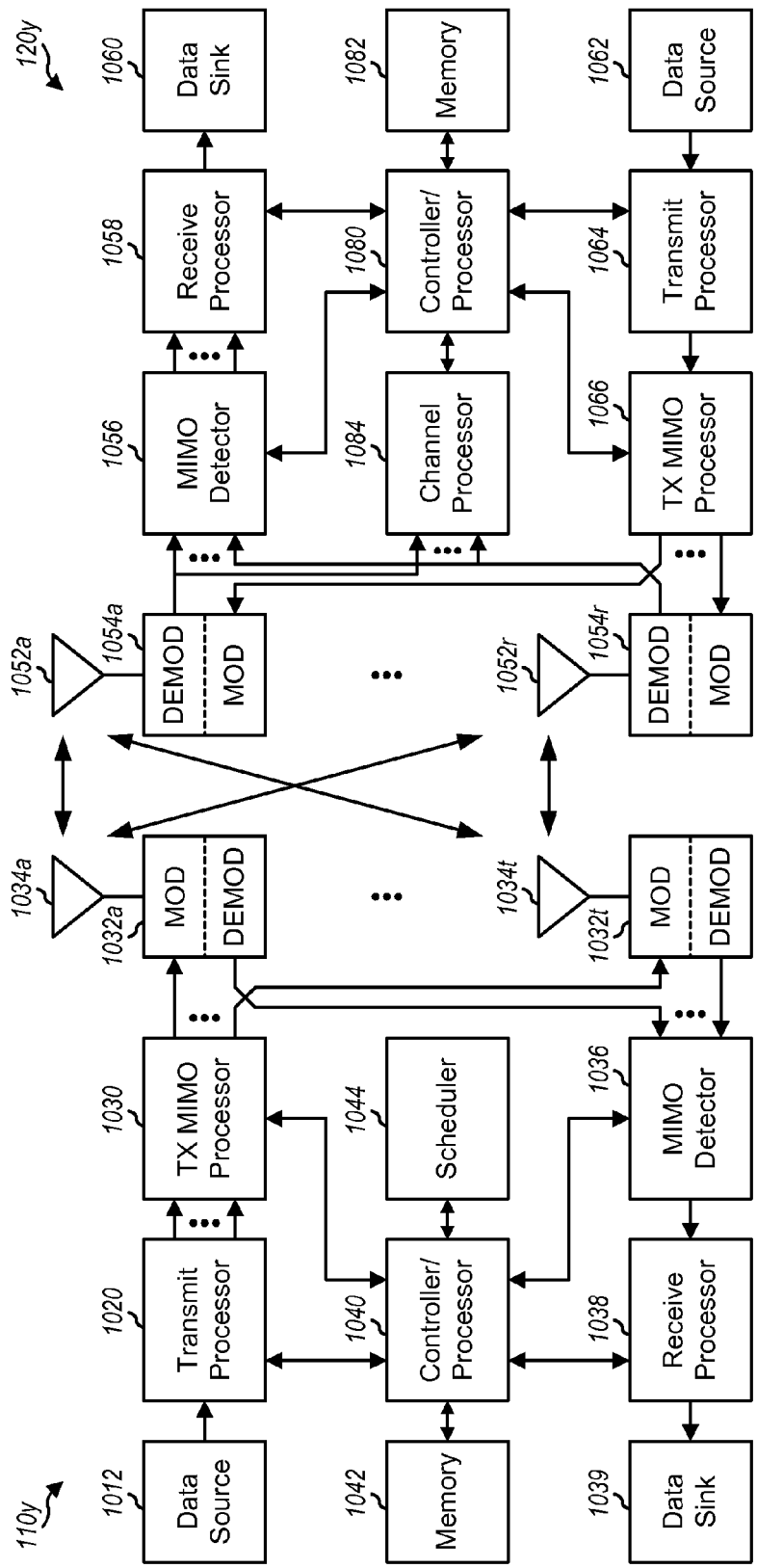
FIG. 10 shows a block diagram of another design of a UE and a base station.

FIG. 10 shows a block diagram of a design of a base station/eNB 110y and a UE 120y, which may be one of the base stations/eNBs and one of the UEs in FIG. 1. Base station 110y may be equipped with T antennas 1034a through 1034t, and UE 120y may be equipped with R antennas 1052a through 1052r, where in general T≥1 and R≥1.

At base station 110y, a transmit processor 1020 may receive data from a data source 1012 for one or more UEs, process (e.g., encode and modulate) the data for each UE based on one or more MCSs selected for that UE, and provide data symbols for all UEs. Transmit processor 1020 may also process control information (e.g., for downlink grants, uplink grants, CSI request, configuration messages, etc.) and provide control symbols. Processor 1020 may also generate reference symbols for reference signals. A transmit (TX) multiple-input multiple-output (MIMO) processor 1030 may precode the data symbols, the control symbols, and/or the reference symbols (if applicable) and may provide T output symbol streams to T modulators (MOD) 1032a through 1032t. Each modulator 1032 may process its output symbol stream (e.g., for OFDM, etc.) to obtain an output sample stream. Each modulator 1032 may further condition (e.g., convert to analog, amplify, filter, and upconvert) its output sample stream to obtain a downlink signal. T downlink signals from modulators 1032a through 1032t may be transmitted via T antennas 1034a through 1034t, respectively.

At UE 120y, antennas 1052a through 1052r may receive the downlink signals from base station 110y and/or other base stations and may provide received signals to demodulators (DEMODs) 1054a through 1054r, respectively. Each demodulator 1054 may condition (e.g., filter, amplify, downconvert, and digitize) its received signal to obtain input samples. Each demodulator 1054 may further process the input samples (e.g., for OFDM, etc.) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate and decode) the detected symbols, provide decoded data for UE 120y to a data sink 1060, and provide decoded control information to a controller/processor 1080. A channel processor 1084 may measure the channel response for different cells (e.g., carriers) based on reference signals received on/from these cells and may determine CSI for each cell of interest.

On the uplink, at UE 120y, a transmit processor 1064 may receive and process data from a data source 1062 and control information from controller/processor 1080. The control information may comprise CSI (e.g., CQI, PMI, PTI, and/or RI), ACK/NACK, SR, etc. Processor 1064 may also generate reference symbols for one or more reference signals. The symbols from transmit processor 1064 may be precoded by a TX MIMO processor 1066 if applicable, further processed by modulators 1054a through 1054r (e.g., for SC-FDM, OFDM, etc.), and transmitted to base station 110y. At base station 110y, the uplink signals from UE 120y and other UEs may be received by antennas 1034, processed by demodulators 1032, detected by a MIMO detector 1036 if applicable, and further processed by a receive processor 1038 to obtain decoded data and control information sent by UE 120y and other UEs. Processor 1038 may provide the decoded data to a data sink 1039 and the decoded control information to controller/processor 1040.

Controllers/processors 1040 and 1080 may direct the operation at base station 110y and UE 120y, respectively. Processor 1080 and/or other processors and modules at UE 120y may perform or direct process 700 in FIG. 7 and/or other processes for the techniques described herein. Processor 1040 and/or other processors and modules at base station 110y may perform or direct process 800 in FIG. 8 and/or other processes for the techniques described herein. Memories 1042 and 1082 may store data and program codes for base station 110y and UE 120y, respectively. A scheduler 1044 may schedule UEs for data transmissions on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
identifying a plurality of cells for which to report channel state information (CSI) by a user equipment (UE);
determining a plurality of control channel formats to use to report the CSI for the plurality of cells in a plurality of subframes, wherein the plurality of control channel formats have different capacities and different multiplexing capabilities;
selecting a first control channel format in the plurality of control channel formats when CSI is reported for only one cell;
selecting a second control channel format in the plurality of control channel formats when CSI is reported for at least two cells; and
reporting CSI based on the selected first control channel format or the selected second control channel format.

2. The method of claim 1, wherein the determining the plurality of control channel formats comprises:
determining a plurality of CSI reporting configurations for the UE for the plurality of cells,
determining CSI to report for the plurality of cells in each of the plurality of subframes based on the plurality of CSI reporting configurations, and
ascertaining the plurality of control channel formats to use based on the CSI to report for the plurality of cells in each of the plurality of subframes.

3. The method of claim 2, wherein a CSI reporting configuration for each of the plurality of cells indicates a schedule of periodic reporting of at least one type of CSI for a respective cell of the plurality of cells.

4. The method of claim 1, further comprising:
ascertaining the plurality of control channel formats to use based on acknowledgement/negative acknowledgement (ACK/NACK) for the plurality of cells, or the capacities of the plurality of control channel formats, or a number of cells configured for CSI reporting by the UE, or a combination thereof.

5. The method of claim 1, further comprising:
selecting a control channel format in the plurality of control channel formats when a total payload size for CSI to report in a subframe is less than a threshold, and
selecting another control channel format in the plurality of control channel formats when the total payload size for the CSI to report in the subframe is greater than the threshold.

6. The method of claim 1, wherein the reporting CSI based on the selected first control channel format or the selected second control channel format comprises:
determining CSI to report for the plurality of cells in a subframe,
determining a control channel format to use in the subframe, and
sending the determined CSI in the subframe based on the control channel format.

7. The method of claim 1, wherein the plurality of cells correspond to a plurality of carriers configured for the UE.

8. The method of claim 1, wherein the plurality of cells correspond to a plurality of transmitting entities selectable to transmit data to the UE for coordinated multi-point (CoMP) transmission.

9. The method of claim 1, wherein the plurality of control channel formats include a first control channel format for a Physical Uplink Control Channel (PUCCH) and a second control channel format for a Physical Uplink Shared Channel (PUSCH).

10. The method of claim 1, wherein reporting the CSI based on the selected first control channel format or the selected second control channel format comprises:
multiplexing CSI on a same set of resources used by one or more other UEs.

11. An apparatus for wireless communication, comprising: at least one processor configured to:
identify a plurality of cells for which to report channel state information (CSI) by a user equipment (UE);
determine a plurality of control channel formats to use to report the CSI for the plurality of cells in a plurality of subframes, wherein the plurality of control channel formats have different capacities and different multiplexing capabilities;
select a first control channel format in the plurality of control channel formats when CSI is reported for only one cell;
select a second control channel format in the plurality of control channel formats when CSI is reported for at least two cells; and
report CSI based on the selected first control channel format or the selected second control channel format; and
a memory coupled to the at least one processor.

12. The apparatus of claim 11, wherein the at least one processor is configured to:
determine a plurality of CSI reporting configurations for the UE for the plurality of cells,
determine CSI to report for the plurality of cells in each of the plurality of subframes based on the plurality of CSI reporting configurations, and
ascertain the plurality of control channel formats to use based on the CSI to report for the plurality of cells in each of the plurality of subframes.

13. The apparatus of claim 11, wherein the at least one processor is configured to:
select a control channel format in the plurality of control channel formats when a total payload size for CSI to report in a subframe is less than a threshold, and
select another control channel format in the plurality of control channel formats when the total payload size for the CSI to report in the subframe is greater than the threshold.

14. The apparatus of claim 11, wherein the at least one processor is configured to:
determine CSI to report for the plurality of cells in a subframe,
determine a control channel format to use in the subframe, and
send the determined CSI in the subframe based on the control channel format.

15. A non-transitory computer-readable medium comprising:
code for causing at least one computer to identify a plurality of cells for which to report channel state information (C SI) by a user equipment (UE);
code for causing the at least one computer to determine a plurality of control channel formats to use to report the CSI for the plurality of cells in a plurality of subframes, wherein the plurality of control channel formats have different capacities and different multiplexing capabilities;

code for causing the at least one computer to select a first control channel format in the plurality of control channel formats when CSI is reported for only one cell;

code for causing the at least one computer to select a second control channel format in the plurality of control channel formats when CSI is reported for at least two cells; and code for causing the at least one computer to report CSI based on the selected first control channel format or the selected second control channel format.

16. A method for wireless communication, comprising:
identifying a plurality of cells for which to receive channel state information (CSI) from a user equipment (UE);
determining a plurality of control channel formats used by the UE to send the CSI for the plurality of cells in a plurality of subframes, wherein the plurality of control channel formats have different capacities and different multiplexing capabilities;
selecting a first control channel format in the plurality of control channel formats when CSI is reported for only one cell;
selecting a second control channel format in the plurality of control channel formats when CSI is reported for at least two cells; and
receiving CSI based on the selected first control channel format or the selected second control channel format.

17. The method of claim 16, wherein the determining the plurality of control channel formats comprises:
determining a plurality of CSI reporting configurations for the UE for the plurality of cells,
determining CSI to be reported for the plurality of cells by the UE in each of the plurality of subframes based on the plurality of CSI reporting configurations, and
ascertaining the plurality of control channel formats used by the UE based on the CSI to be reported by the UE in each of the plurality of subframes.

18. The method of claim 16, further comprising:
ascertaining the plurality of control channel formats used by the UE based on acknowledgement/negative acknowledgement (ACK/NACK) for the plurality of cells, or the capacities of the plurality of control channel formats, or a number of cells configured for CSI reporting by the UE, or a combination thereof.

19. The method of claim 16, further comprising:
selecting a control channel format in the plurality of control channel formats when a total payload size for CSI to be reported in a subframe is less than a threshold; and
selecting another control channel format in the plurality of control channel formats when the total payload size for the CSI to be reported in the subframe is greater than the threshold.

20. The method of claim 16, wherein the receiving CSI based on the selected first control channel format or the selected second control channel format comprises:
determining CSI to be reported by the UE for the plurality of cells in a subframe,
determining a control channel format used by the UE in the subframe, and
receiving the determined CSI in the subframe based on the control channel format.

21. The method of claim 16, wherein the plurality of cells correspond to a plurality of carriers configured for the UE.

22. The method of claim 16, wherein the plurality of cells correspond to a plurality of transmitting entities selectable to transmit data to the UE for coordinated multi-point (CoMP) transmission.

23. The method of claim 16, wherein the plurality of control channel formats include a first control channel format for a Physical Uplink Control Channel (PUCCH) and a second control channel format for a Physical Uplink Shared Channel (PUSCH).

24. The method of claim 16, wherein receiving the CSI based on the selected first control channel format or the selected second control channel format comprises:
receiving, from the UE, CSI which is multiplexed on a same set of resources used by one or more other UEs.

25. An apparatus for wireless communication, comprising:
at least one processor configured to:
identify a plurality of cells for which to receive channel state information (CSI) from a user equipment (UE);
determine a plurality of control channel formats used by the UE to send the CSI for the plurality of cells in a plurality of subframes, wherein the plurality of control channel formats have different capacities and different multiplexing capabilities;
select a first control channel format in the plurality of control channel formats when CSI is reported for only one cell;
select a second control channel format in the plurality of control channel formats when CSI is reported for at least two cells; and
receive CSI based on the selected first control channel format or the selected second control channel format; and
a memory coupled to the at least one processor.

26. The apparatus of claim 25, wherein the at least one processor is configured to:
determine a plurality of CSI reporting configurations for the UE for the plurality of cells,
determine CSI to be reported for the plurality of cells by the UE in each of the plurality of subframes based on the plurality of CSI reporting configurations, and
ascertain the plurality of control channel formats used by the UE based on the CSI to be reported by the UE in each of the plurality of subframes.

27. The apparatus of claim 25, wherein the at least one processor is configured to:
select a control channel format in the plurality of control channel formats when a total payload size for CSI to be reported in a subframe is less than a threshold; and
select another control channel format in the plurality of control channel formats when the total payload size for the CSI to be reported in the subframe is greater than the threshold.

28. The apparatus of claim 25, wherein the at least one processor is configured to:
determine CSI to be reported by the UE for the plurality of cells in a subframe,
determine a control channel format used by the UE in the subframe, and
receive the determined CSI in the subframe based on the control channel format.

29. A non-transitory computer-readable medium comprising:

code for causing at least one computer to identify a plurality of cells for which to receive channel state information (CSI) from a user equipment (UE);

code for causing the at least one computer to determine a plurality of control channel formats used by the UE to send the CSI for the plurality of cells in a plurality of subframes, wherein the plurality of control channel formats have different capacities and different multiplexing capabilities;

code for causing the at least one computer to select a first control channel format in the plurality of control channel formats when CSI is reported for only one cell;

code for causing the at least one computer to select a second control channel format in the plurality of control channel formats when CSI is reported for at least two cells; and code for causing the at least one computer to receive CSI based on the selected first control channel format or the selected second control channel format.

* * * * *